US011928696B2

(12) United States Patent
Nelsen et al.

(10) Patent No.: US 11,928,696 B2
(45) Date of Patent: Mar. 12, 2024

(54) SYSTEMS AND METHODS FOR GENERATING A VIRTUAL VALUE ITEM FOR A PROMOTIONAL CAMPAIGN

(75) Inventors: David A. Nelsen, Tigard, OR (US); Christian Casebeer, Portland, OR (US); Michael J. Fletcher, Beaverton, OR (US)

(73) Assignee: E2INTERACTIVE, INC., Atlanta, GA (US)

( * ) Notice: Subject to any disclaimer, the term of this patent is extended or adjusted under 35 U.S.C. 154(b) by 0 days.

(21) Appl. No.: 12/970,786

(22) Filed: Dec. 16, 2010

(65) Prior Publication Data

US 2011/0145044 A1 Jun. 16, 2011

Related U.S. Application Data

(60) Provisional application No. 61/287,105, filed on Dec. 16, 2009.

(51) Int. Cl.
| | |
|---|---|
| *G06Q 30/02* | (2023.01) |
| *G06Q 30/0207* | (2023.01) |
| *G06Q 30/0241* | (2023.01) |
| *G06F 3/048* | (2013.01) |

(52) U.S. Cl.
CPC ......... *G06Q 30/02* (2013.01); *G06Q 30/0212* (2013.01); *G06Q 30/0276* (2013.01); *G06F 3/048* (2013.01)

(58) Field of Classification Search
CPC .... G06F 3/048; G06Q 30/02; G06Q 30/0212; G06Q 30/0276; G06Q 30/0207–30/0277
USPC .......................................................... 705/14
See application file for complete search history.

(56) References Cited

U.S. PATENT DOCUMENTS

| | | |
|---|---|---|
| 3,288,350 A | 11/1966 | Kushner |
| 4,900,904 A | 2/1990 | Wright et al. |
| 5,091,634 A | 2/1992 | Finch et al. |
| 5,117,355 A | 5/1992 | Mccarthy |
| 5,202,826 A | 4/1993 | Mccarthy |
| 5,239,165 A | 8/1993 | Novak |
| 5,256,863 A | 10/1993 | Ferguson |
| 5,274,845 A | 12/1993 | Wang |
| 5,311,424 A | 5/1994 | Mukherjee |
| 5,367,148 A | 11/1994 | Storch |

(Continued)

FOREIGN PATENT DOCUMENTS

| | | |
|---|---|---|
| CN | 102609839 A | 7/2012 |
| EP | 0950968 A1 | 10/1999 |

(Continued)

OTHER PUBLICATIONS

ISA Korean Intellectual Property Office, International Search Report of PCT/US2009/056118, dated Apr. 19, 2010, 3 pages.

(Continued)

*Primary Examiner* — Thuy N Nguyen
(74) *Attorney, Agent, or Firm* — LANDMARK IP LAW, LLC; Gregory M Murphy

(57) ABSTRACT

Systems and methods for managing a promotional campaign are provided. In one embodiment, a promotional campaign engine communicates in real-time with a participant's mobile computing device, receives an electronic campaign entry from the mobile computing device, and based on a rule set, generates a virtual value item in an established stored value system based on the rule set.

9 Claims, 4 Drawing Sheets

(56) References Cited

U.S. PATENT DOCUMENTS

| | | |
|---|---|---|
| 5,375,240 A | 12/1994 | Grundy |
| 5,383,113 A | 1/1995 | Kight et al. |
| 5,581,064 A | 12/1996 | Riley |
| 5,590,038 A | 12/1996 | Pitroda |
| 5,602,377 A | 2/1997 | Beller et al. |
| 5,619,559 A | 4/1997 | Kennedy |
| 5,671,279 A | 9/1997 | Elgamal |
| 5,699,528 A | 12/1997 | Hogan |
| 5,708,780 A | 1/1998 | Levergood |
| 5,729,693 A | 3/1998 | Holda-Fleck |
| 5,734,719 A | 3/1998 | Tsvedos |
| 5,740,915 A | 4/1998 | Williams |
| 5,799,285 A | 8/1998 | Klingman |
| 5,806,045 A | 9/1998 | Biorge et al. |
| 5,850,217 A | 12/1998 | Cole |
| 5,857,175 A | 1/1999 | Day |
| 5,870,724 A | 2/1999 | Lawlor et al. |
| 5,873,072 A | 2/1999 | Kight et al. |
| 5,878,401 A | 3/1999 | Joseph |
| 5,884,271 A | 3/1999 | Pitroda |
| 5,889,270 A | 3/1999 | Van Haagen |
| 5,897,625 A | 4/1999 | Gustin |
| 5,903,874 A | 5/1999 | Leonard et al. |
| 5,907,142 A | 5/1999 | Kelsey |
| 5,913,210 A | 6/1999 | Call |
| 5,918,213 A | 6/1999 | Bernard |
| 5,950,173 A | 9/1999 | Perkowski |
| 5,953,710 A | 9/1999 | Fleming |
| 5,968,110 A | 10/1999 | Westrope |
| 5,984,508 A | 11/1999 | Hurley |
| 5,991,413 A | 11/1999 | Arditti et al. |
| 5,991,749 A | 11/1999 | Morrill, Jr. |
| 6,000,608 A | 12/1999 | Dorf |
| 6,018,719 A | 1/2000 | Rogers |
| 6,025,780 A | 2/2000 | Bowers |
| 6,029,139 A | 2/2000 | Cunningham |
| 6,029,141 A | 2/2000 | Bezos |
| 6,029,151 A | 2/2000 | Nikander |
| 6,039,244 A | 3/2000 | Finstrewald |
| 6,049,778 A | 4/2000 | Walker |
| 6,055,511 A | 4/2000 | Luebbering |
| 6,055,567 A | 4/2000 | Ganesan et al. |
| 6,062,472 A | 5/2000 | Cheung |
| 6,070,147 A | 5/2000 | Harms et al. |
| 6,070,150 A | 5/2000 | Remington et al. |
| 6,085,167 A | 7/2000 | Iguchi |
| 6,085,242 A | 7/2000 | Chandra |
| 6,119,164 A | 9/2000 | Basche |
| 6,125,352 A | 9/2000 | Franklin |
| 6,134,533 A | 10/2000 | Shell |
| 6,138,911 A | 10/2000 | Fredregil |
| 6,142,369 A | 11/2000 | Jonstromer |
| 6,148,249 A | 11/2000 | Newman |
| 6,163,843 A | 12/2000 | Inoue et al. |
| 6,169,890 B1 | 1/2001 | Vatanen |
| 6,175,823 B1 | 1/2001 | Van Dusen |
| 6,185,545 B1 | 2/2001 | Resnick et al. |
| 6,189,787 B1 | 2/2001 | Dorf |
| 6,190,256 B1 | 2/2001 | Walker et al. |
| 6,219,652 B1 | 4/2001 | Carter |
| 6,222,914 B1 | 4/2001 | McMullin |
| 6,240,397 B1 | 5/2001 | Sachs |
| 6,267,670 B1 | 7/2001 | Walker |
| 6,289,322 B1 | 9/2001 | Kitchen et al. |
| 6,304,860 B1 | 10/2001 | Martin |
| 6,315,195 B1 | 11/2001 | Ramachandran |
| 6,317,028 B1 | 11/2001 | Valiulis |
| 6,324,525 B1 | 11/2001 | Kramer et al. |
| 6,327,577 B1 | 12/2001 | Garrison et al. |
| 6,334,116 B1 | 12/2001 | Ganesan et al. |
| 6,360,254 B1 | 3/2002 | Linden |
| 6,363,362 B1 | 3/2002 | Burfield et al. |
| 6,363,364 B1 | 3/2002 | Nel |
| 6,366,893 B2 | 4/2002 | Hannula et al. |
| 6,424,706 B1 | 7/2002 | Katz et al. |
| 6,442,532 B1 | 8/2002 | Kawan |
| 6,467,684 B2 | 10/2002 | Fite et al. |
| 6,473,739 B1 | 10/2002 | Showghi et al. |
| 6,507,823 B1 | 1/2003 | Nel |
| 6,529,956 B1 | 3/2003 | Smith |
| 6,536,659 B1 | 3/2003 | Hauser |
| 6,542,933 B1 | 4/2003 | Durst |
| 6,550,672 B1 | 4/2003 | Tracy |
| 6,575,361 B1 | 6/2003 | Graves et al. |
| 6,594,640 B1 | 7/2003 | Postrel |
| 6,594,644 B1 | 7/2003 | Van Dusen |
| 6,609,113 B1 | 8/2003 | O'Leary et al. |
| 6,615,190 B1 | 9/2003 | Slater |
| 6,622,015 B1 | 9/2003 | Himmel et al. |
| 6,636,833 B1 | 10/2003 | Flitcroft |
| 6,648,222 B2 | 11/2003 | McDonald et al. |
| 6,678,664 B1 | 1/2004 | Ganesan |
| 6,684,269 B2 | 1/2004 | Wagner |
| 6,705,520 B1 | 3/2004 | Pitroda et al. |
| 6,748,365 B1 | 6/2004 | Quinlan et al. |
| 6,769,607 B1 | 8/2004 | Pitroda et al. |
| 6,805,289 B2 | 10/2004 | Noriega et al. |
| 6,807,410 B1 | 10/2004 | Pailles et al. |
| 6,819,219 B1 | 11/2004 | Bolle et al. |
| 6,829,596 B1 | 12/2004 | Frazee |
| 6,836,765 B1 | 12/2004 | Sussman |
| 6,839,692 B2 | 1/2005 | Carrott et al. |
| 6,839,744 B1 | 1/2005 | Kloba et al. |
| 6,847,935 B1 | 1/2005 | Solomon et al. |
| 6,848,613 B2 | 2/2005 | Nielsen et al. |
| 6,852,031 B1 | 2/2005 | Rowe |
| 6,856,974 B1 | 2/2005 | Ganesan et al. |
| 6,862,575 B1 | 3/2005 | Anttila |
| 6,865,544 B1 | 3/2005 | Austin |
| 6,868,391 B1 | 3/2005 | Hultgren |
| 6,899,621 B2 | 5/2005 | Behm |
| 6,915,277 B1 | 7/2005 | Manchester |
| 6,918,537 B2 | 7/2005 | Graves et al. |
| 6,925,439 B1 | 8/2005 | Pitroda |
| 6,932,268 B1 | 8/2005 | McCoy et al. |
| 6,934,529 B2 | 8/2005 | Bagoren et al. |
| 6,934,689 B1 | 8/2005 | Ritter et al. |
| 6,941,270 B1 | 9/2005 | Hannula |
| 6,948,063 B1 | 9/2005 | Ganesan et al. |
| 6,965,866 B2 | 11/2005 | Klein |
| 6,975,937 B1 | 12/2005 | Kantarjilev |
| 6,988,657 B1 | 1/2006 | Singer et al. |
| 6,993,510 B2 | 1/2006 | Guy |
| 7,003,499 B2 | 2/2006 | Arditti et al. |
| 7,014,107 B2 | 3/2006 | Singer et al. |
| 7,016,863 B1 | 3/2006 | Kamakura |
| 7,024,396 B2 | 4/2006 | Woodward |
| 7,054,842 B2 | 5/2006 | James et al. |
| 7,055,740 B1 | 6/2006 | Schultz |
| 7,069,248 B2 | 6/2006 | Huber |
| 7,072,854 B2 | 7/2006 | Loeser |
| 7,083,084 B2 | 8/2006 | Graves et al. |
| 7,085,931 B1 | 8/2006 | Smith et al. |
| 7,086,584 B2 | 8/2006 | Stoutenburg et al. |
| 7,090,138 B2 | 8/2006 | Rettenmyer et al. |
| 7,093,761 B2 | 8/2006 | Smith et al. |
| 7,117,227 B2 | 10/2006 | Call |
| 7,128,274 B2 | 10/2006 | Kelley et al. |
| 7,130,817 B2 | 10/2006 | Karas et al. |
| 7,143,055 B1 | 11/2006 | Perkowski |
| 7,162,440 B2 | 1/2007 | Koons |
| 7,165,052 B2 | 1/2007 | Diveley et al. |
| 7,182,252 B1 | 2/2007 | Cooper et al. |
| 7,194,438 B2 | 3/2007 | Sovio et al. |
| 7,209,889 B1 | 4/2007 | Whitfield |
| 7,216,092 B1 | 5/2007 | Weber |
| 7,222,101 B2 | 5/2007 | Bishop et al. |
| 7,229,006 B2 | 6/2007 | Babbi et al. |
| 7,229,014 B1 | 6/2007 | Snyder |
| 7,249,097 B2 | 7/2007 | Hutchison et al. |
| 7,252,226 B2 | 8/2007 | Risafi et al. |
| 7,292,998 B2 | 11/2007 | Graves et al. |
| 7,316,350 B2 | 1/2008 | Algiene |
| 7,328,190 B2 | 2/2008 | Smith et al. |

(56) References Cited

U.S. PATENT DOCUMENTS

| | | |
|---|---|---|
| 7,356,327 B2 | 4/2008 | Cai et al. |
| 7,376,431 B2 | 5/2008 | Niedermeyer |
| 7,376,583 B1 | 5/2008 | Rolf |
| 7,383,226 B2 | 6/2008 | Kight et al. |
| 7,398,248 B2 | 7/2008 | Phillips et al. |
| 7,400,883 B2 | 7/2008 | Rivers |
| 7,415,617 B2 | 8/2008 | Ginter |
| 7,478,143 B1 | 1/2009 | Friedman et al. |
| 7,494,417 B2 | 2/2009 | Walker |
| 7,519,543 B2 | 4/2009 | Ota |
| 7,590,557 B2 | 9/2009 | Harrison |
| 7,631,803 B2 | 12/2009 | Peyret et al. |
| 7,690,580 B2 | 4/2010 | Shoemaker |
| 7,702,542 B2 | 4/2010 | Aslanian |
| 7,711,598 B2 | 5/2010 | Perkowski |
| 7,725,326 B1 | 5/2010 | Tracy |
| 7,735,724 B2 | 6/2010 | Fujita |
| 7,747,644 B1 | 6/2010 | Reihl |
| 7,757,944 B2 | 7/2010 | Cline et al. |
| 7,774,209 B2 | 8/2010 | James et al. |
| 7,840,437 B2 | 11/2010 | Lewis |
| 7,848,948 B2 | 12/2010 | Perkowski et al. |
| 7,904,333 B1 | 3/2011 | Perkowski |
| 7,905,399 B2 | 3/2011 | Barnes |
| 7,917,386 B2 | 3/2011 | Christensen |
| 7,940,333 B2 | 3/2011 | Perkowski |
| 7,959,076 B1 | 6/2011 | Hopkins |
| 8,060,413 B2 | 11/2011 | Castell et al. |
| 8,095,439 B1 | 1/2012 | Harman et al. |
| 8,099,360 B2 * | 1/2012 | Walker ............. G06Q 20/363 |
| | | 235/382 |
| 8,103,520 B2 | 1/2012 | Mueller |
| 8,109,436 B1 | 2/2012 | Hopkins |
| 8,245,910 B2 | 8/2012 | Sullivan et al. |
| 8,267,313 B2 | 9/2012 | Harper et al. |
| 8,332,277 B2 | 12/2012 | Mccaffery et al. |
| 8,332,323 B2 | 12/2012 | Stals |
| 8,352,627 B1 | 1/2013 | Harris |
| 8,355,982 B2 | 1/2013 | Hazel |
| 8,371,502 B1 | 2/2013 | Galit et al. |
| 8,396,758 B2 | 3/2013 | Paradise |
| 8,509,814 B1 | 8/2013 | Parker |
| 8,577,735 B2 | 11/2013 | Wilen |
| 8,636,203 B1 | 1/2014 | Patterson |
| 8,662,387 B1 | 3/2014 | Geller |
| 8,676,672 B2 | 3/2014 | Nelsen |
| 8,712,835 B1 | 4/2014 | Philyaw |
| 8,751,298 B1 | 6/2014 | Giordano et al. |
| 8,768,834 B2 | 7/2014 | Zacarias et al. |
| 9,098,190 B2 | 8/2015 | Zhou |
| 9,183,534 B2 | 11/2015 | Gharabally |
| 9,449,343 B2 | 9/2016 | Mayerle |
| 9,483,786 B2 * | 11/2016 | Glass ................... G06Q 30/06 |
| 9,626,070 B2 | 4/2017 | Cowles |
| 9,672,687 B2 | 6/2017 | Cage |
| 9,881,299 B2 * | 1/2018 | Isaacson ............ G06Q 20/105 |
| 10,262,346 B2 | 4/2019 | Glass |
| 10,515,397 B2 | 12/2019 | Serfass |
| 10,679,268 B1 | 6/2020 | Kochhar |
| 2001/0001856 A1 | 5/2001 | Gould et al. |
| 2001/0005840 A1 | 6/2001 | Verkama |
| 2001/0007983 A1 | 7/2001 | Lee |
| 2001/0011248 A1 | 8/2001 | Himmel et al. |
| 2001/0037264 A1 | 11/2001 | Husemann et al. |
| 2001/0044776 A1 | 11/2001 | Kight et al. |
| 2001/0056410 A1 | 12/2001 | Ishigaki |
| 2002/0002503 A1 | 1/2002 | Matsuoka |
| 2002/0002535 A1 | 1/2002 | Kitchen et al. |
| 2002/0010627 A1 | 1/2002 | Lerat |
| 2002/0010677 A1 | 1/2002 | Kitchen et al. |
| 2002/0013768 A1 | 1/2002 | Ganesan |
| 2002/0019809 A1 | 2/2002 | Kitchen et al. |
| 2002/0022472 A1 | 2/2002 | Watler et al. |
| 2002/0046165 A1 | 4/2002 | Kitchen et al. |
| 2002/0046166 A1 | 4/2002 | Kitchen et al. |
| 2002/0046167 A1 | 4/2002 | Kitchen et al. |
| 2002/0046168 A1 | 4/2002 | Kitchen et al. |
| 2002/0049672 A1 | 4/2002 | Kitchen et al. |
| 2002/0052840 A1 | 5/2002 | Kitchen et al. |
| 2002/0052841 A1 | 5/2002 | Guthrie et al. |
| 2002/0060243 A1 | 5/2002 | Janiak et al. |
| 2002/0062249 A1 | 5/2002 | Iannacci |
| 2002/0062282 A1 | 5/2002 | Kight et al. |
| 2002/0065713 A1 | 5/2002 | Awada et al. |
| 2002/0065773 A1 | 5/2002 | Kight et al. |
| 2002/0065774 A1 | 5/2002 | Young et al. |
| 2002/0077993 A1 | 6/2002 | Immonen et al. |
| 2002/0088855 A1 | 7/2002 | Hodes |
| 2002/0091573 A1 | 7/2002 | Hodes |
| 2002/0095387 A1 | 7/2002 | Sosa et al. |
| 2002/0107791 A1 | 8/2002 | Nobrega |
| 2002/0111906 A1 | 8/2002 | Garrison et al. |
| 2002/0116329 A1 | 8/2002 | Serbetcioglu et al. |
| 2002/0116531 A1 | 8/2002 | Chu |
| 2002/0120571 A1 | 8/2002 | Maung et al. |
| 2002/0128968 A1 | 9/2002 | Kitchen et al. |
| 2002/0138450 A1 | 9/2002 | Kremer |
| 2002/0138573 A1 | 9/2002 | Saguy |
| 2002/0152123 A1 | 10/2002 | Giordano et al. |
| 2002/0152160 A1 | 10/2002 | Allen-Rouman et al. |
| 2002/0152179 A1 | 10/2002 | Racov |
| 2002/0153414 A1 | 10/2002 | Stoutenburg et al. |
| 2002/0161631 A1 | 10/2002 | Banerjee et al. |
| 2002/0169713 A1 | 11/2002 | Chang et al. |
| 2002/0178062 A1 | 11/2002 | Wright et al. |
| 2002/0190123 A1 | 12/2002 | Anvekar et al. |
| 2002/0198737 A1 | 12/2002 | Valtanen |
| 2003/0004802 A1 | 1/2003 | Callegari |
| 2003/0004891 A1 | 1/2003 | Van Rensburg et al. |
| 2003/0004894 A1 | 1/2003 | Rowney |
| 2003/0009382 A1 | 1/2003 | D'Arbeloff |
| 2003/0023552 A1 | 1/2003 | Kight et al. |
| 2003/0055735 A1 | 3/2003 | Cameron et al. |
| 2003/0074328 A1 | 4/2003 | Schiff et al. |
| 2003/0078835 A1 | 4/2003 | Pluchinske |
| 2003/0093366 A1 | 5/2003 | Halfer |
| 2003/0105688 A1 | 6/2003 | Brown et al. |
| 2003/0115126 A1 | 6/2003 | Pirtroda |
| 2003/0121967 A1 | 7/2003 | Goldberg et al. |
| 2003/0126079 A1 | 7/2003 | Roberson |
| 2003/0141358 A1 | 7/2003 | Hudson |
| 2003/0154163 A1 | 8/2003 | Phillips et al. |
| 2003/0162565 A1 | 8/2003 | Al-Khaja |
| 2003/0163787 A1 | 8/2003 | Hay et al. |
| 2003/0167207 A1 | 9/2003 | Berardi et al. |
| 2003/0172039 A1 | 9/2003 | Ota |
| 2003/0191711 A1 | 10/2003 | Jamison et al. |
| 2003/0197059 A1 | 10/2003 | Tidball et al. |
| 2003/0200144 A1 | 10/2003 | Antonucci et al. |
| 2003/0200184 A1 | 10/2003 | Dominguez et al. |
| 2003/0204441 A1 | 10/2003 | Ellis et al. |
| 2003/0212601 A1 | 11/2003 | Silva et al. |
| 2003/0218062 A1 | 11/2003 | Noriega et al. |
| 2003/0218066 A1 | 11/2003 | Fernandes et al. |
| 2003/0220884 A1 | 11/2003 | Choi et al. |
| 2003/0226042 A1 | 12/2003 | Fukushima |
| 2003/0229590 A1 | 12/2003 | Byrne et al. |
| 2003/0233317 A1 | 12/2003 | Judd |
| 2003/0233318 A1 | 12/2003 | King et al. |
| 2003/0234819 A1 | 12/2003 | Daly et al. |
| 2004/0010462 A1 | 1/2004 | Moon et al. |
| 2004/0019564 A1 | 1/2004 | Goldthwaite et al. |
| 2004/0019568 A1 | 1/2004 | Moenickheim et al. |
| 2004/0029569 A1 | 2/2004 | Khan et al. |
| 2004/0039639 A1 | 2/2004 | Walker et al. |
| 2004/0049456 A1 | 3/2004 | Dreyer |
| 2004/0049458 A1 | 3/2004 | Kunugi et al. |
| 2004/0059671 A1 | 3/2004 | Nozaki et al. |
| 2004/0064409 A1 | 4/2004 | Kight et al. |
| 2004/0068446 A1 | 4/2004 | Do et al. |
| 2004/0068448 A1 | 4/2004 | Kim |
| 2004/0078327 A1 | 4/2004 | Frazier et al. |
| 2004/0078332 A1 | 4/2004 | Ferguson et al. |
| 2004/0083170 A1 | 4/2004 | Bam et al. |

(56) References Cited

U.S. PATENT DOCUMENTS

| | | |
|---|---|---|
| 2004/0083171 A1 | 4/2004 | Kight et al. |
| 2004/0093281 A1 | 5/2004 | Silverstein et al. |
| 2004/0093305 A1 | 5/2004 | Kight et al. |
| 2004/0094624 A1 | 5/2004 | Fernandes et al. |
| 2004/0107170 A1 | 6/2004 | Labrou et al. |
| 2004/0117302 A1 | 6/2004 | Weichert et al. |
| 2004/0117728 A1* | 6/2004 | Gromer ............... G09B 5/02 715/256 |
| 2004/0118914 A1 | 6/2004 | Smith et al. |
| 2004/0128197 A1 | 7/2004 | Bam et al. |
| 2004/0139005 A1 | 7/2004 | Ganesan |
| 2004/0139318 A1 | 7/2004 | Fiala et al. |
| 2004/0159700 A1 | 8/2004 | Khan et al. |
| 2004/0162058 A1 | 8/2004 | Mottes |
| 2004/0167853 A1 | 8/2004 | Sharma |
| 2004/0181453 A1 | 9/2004 | Ray et al. |
| 2004/0181463 A1 | 9/2004 | Goldthwaite et al. |
| 2004/0185881 A1 | 9/2004 | Lee |
| 2004/0193464 A1 | 9/2004 | Szrek |
| 2004/0199431 A1 | 10/2004 | Ganesan et al. |
| 2004/0199474 A1 | 10/2004 | Ritter |
| 2004/0215560 A1 | 10/2004 | Amalraj et al. |
| 2004/0215564 A1 | 10/2004 | Lawlor et al. |
| 2004/0224660 A1 | 11/2004 | Anderson |
| 2004/0225560 A1 | 11/2004 | Lewis et al. |
| 2004/0230489 A1 | 11/2004 | Goldthwaite et al. |
| 2004/0242208 A1 | 12/2004 | Teicher |
| 2004/0243490 A1 | 12/2004 | Murto et al. |
| 2004/0249710 A1 | 12/2004 | Smith |
| 2004/0249766 A1 | 12/2004 | Ganesan et al. |
| 2004/0267663 A1 | 12/2004 | Karns |
| 2004/0267664 A1 | 12/2004 | Nam et al. |
| 2004/0267665 A1 | 12/2004 | Nam et al. |
| 2005/0004837 A1 | 1/2005 | Sweeny |
| 2005/0015388 A1 | 1/2005 | Dasgupta et al. |
| 2005/0021400 A1 | 1/2005 | Postrel |
| 2005/0021457 A1 | 1/2005 | Johnson |
| 2005/0027624 A1 | 2/2005 | Cai |
| 2005/0060261 A1 | 3/2005 | Remington et al. |
| 2005/0065876 A1 | 3/2005 | Kumar |
| 2005/0071179 A1 | 3/2005 | Peters et al. |
| 2005/0071269 A1 | 3/2005 | Peters |
| 2005/0075958 A1 | 4/2005 | Gonzalez |
| 2005/0075975 A1 | 4/2005 | Rosner et al. |
| 2005/0079863 A1 | 4/2005 | Macaluso |
| 2005/0080634 A1 | 4/2005 | Kanniainen et al. |
| 2005/0080727 A1 | 4/2005 | Postrel |
| 2005/0086164 A1 | 4/2005 | Kim et al. |
| 2005/0086168 A1 | 4/2005 | Alvarez |
| 2005/0096981 A1 | 5/2005 | Shimada |
| 2005/0097038 A1 | 5/2005 | Yu et al. |
| 2005/0103839 A1 | 5/2005 | Hewel |
| 2005/0108096 A1 | 5/2005 | Burger et al. |
| 2005/0109835 A1 | 5/2005 | Jacoby et al. |
| 2005/0116028 A1 | 6/2005 | Cotten |
| 2005/0125292 A1 | 6/2005 | Kassab et al. |
| 2005/0125343 A1 | 6/2005 | Mendelovich |
| 2005/0125348 A1 | 6/2005 | Fulton et al. |
| 2005/0137978 A1 | 6/2005 | Ganesan et al. |
| 2005/0149387 A1 | 7/2005 | O'Shea et al. |
| 2005/0174975 A1 | 8/2005 | Mgrdechian et al. |
| 2005/0177437 A1 | 8/2005 | Ferrier |
| 2005/0177517 A1 | 8/2005 | Leung |
| 2005/0182714 A1 | 8/2005 | Nel |
| 2005/0184145 A1 | 8/2005 | Law et al. |
| 2005/0187873 A1 | 8/2005 | Labrou et al. |
| 2005/0197919 A1 | 9/2005 | Robertson |
| 2005/0203844 A1 | 9/2005 | Ferguson et al. |
| 2005/0209965 A1 | 9/2005 | Ganesan |
| 2005/0222925 A1 | 10/2005 | Jamieson |
| 2005/0222961 A1 | 10/2005 | Staib et al. |
| 2005/0233797 A1 | 10/2005 | Gilmore |
| 2005/0240477 A1 | 10/2005 | Friday |
| 2005/0247777 A1 | 11/2005 | Pitroda |
| 2005/0262017 A1 | 11/2005 | Kawase et al. |
| 2005/0269401 A1 | 12/2005 | Spitzer et al. |
| 2005/0269402 A1 | 12/2005 | Spitzer et al. |
| 2005/0274793 A1 | 12/2005 | Cantini |
| 2006/0000900 A1 | 1/2006 | Fernandes et al. |
| 2006/0004631 A1 | 1/2006 | Roberts et al. |
| 2006/0004656 A1 | 1/2006 | Lee |
| 2006/0006226 A1 | 1/2006 | Fitzgerald et al. |
| 2006/0026070 A1 | 2/2006 | Sun |
| 2006/0037835 A1 | 2/2006 | Doran |
| 2006/0041470 A1 | 2/2006 | Filho et al. |
| 2006/0053056 A1 | 3/2006 | Alspach-Goss et al. |
| 2006/0058011 A1 | 3/2006 | Vanska |
| 2006/0074767 A1 | 4/2006 | Fortney et al. |
| 2006/0080232 A1 | 4/2006 | Epps |
| 2006/0085310 A1 | 4/2006 | Mylet et al. |
| 2006/0089160 A1 | 4/2006 | Othmer |
| 2006/0089893 A1 | 4/2006 | Joseph et al. |
| 2006/0116892 A1 | 6/2006 | Grimes et al. |
| 2006/0136334 A1 | 6/2006 | Atkinson et al. |
| 2006/0136901 A1 | 6/2006 | Nichols |
| 2006/0163343 A1 | 7/2006 | Changryeol |
| 2006/0163347 A1 | 7/2006 | Foss et al. |
| 2006/0167744 A1 | 7/2006 | Yoo |
| 2006/0195359 A1 | 8/2006 | Robinson et al. |
| 2006/0206431 A1 | 9/2006 | Scott et al. |
| 2006/0206436 A1 | 9/2006 | James et al. |
| 2006/0218038 A1 | 9/2006 | Grider |
| 2006/0224450 A1 | 10/2006 | Moon |
| 2006/0224454 A1 | 10/2006 | Kantor et al. |
| 2006/0253320 A1 | 11/2006 | Heywood |
| 2006/0255125 A1 | 11/2006 | Jennings |
| 2007/0017976 A1* | 1/2007 | Peyret et al. ................. 235/380 |
| 2007/0021969 A1 | 1/2007 | Homeier-Beals |
| 2007/0030824 A1 | 2/2007 | Ribaudo |
| 2007/0038577 A1 | 2/2007 | Werner |
| 2007/0043682 A1 | 2/2007 | Drapkin et al. |
| 2007/0055785 A1 | 3/2007 | Stevens |
| 2007/0156436 A1 | 4/2007 | Fisher |
| 2007/0100761 A1 | 5/2007 | Dillon |
| 2007/0114274 A1 | 5/2007 | Gibbs |
| 2007/0125838 A1 | 6/2007 | Law et al. |
| 2007/0130085 A1 | 6/2007 | Zhu |
| 2007/0162337 A1 | 7/2007 | Hawkins et al. |
| 2007/0174123 A1 | 7/2007 | Dorr |
| 2011/0060904 A9 | 7/2007 | Whitfield |
| 2007/0175984 A1 | 8/2007 | Khandaker et al. |
| 2007/0192182 A1 | 8/2007 | Monaco |
| 2007/0198347 A1 | 8/2007 | Muldoon |
| 2007/0198418 A1 | 8/2007 | Macdonald et al. |
| 2007/0203788 A1 | 8/2007 | Andalib et al. |
| 2007/0208618 A1 | 9/2007 | Paintin |
| 2007/0210152 A1 | 9/2007 | Read |
| 2007/0233615 A1 | 10/2007 | Tumminaro |
| 2007/0244872 A1 | 10/2007 | Hancock |
| 2007/0257767 A1 | 11/2007 | Beeson |
| 2007/0262140 A1 | 11/2007 | Long |
| 2007/0265872 A1 | 11/2007 | Robinson et al. |
| 2007/0272743 A1 | 11/2007 | Christie et al. |
| 2008/0006685 A1 | 1/2008 | Rackley, III et al. |
| 2008/0010190 A1 | 1/2008 | Rackley, III et al. |
| 2008/0010191 A1 | 1/2008 | Rackley, III et al. |
| 2008/0010192 A1 | 1/2008 | Rackley, III et al. |
| 2008/0010193 A1 | 1/2008 | Rackley, III et al. |
| 2008/0010196 A1 | 1/2008 | Rackley, III et al. |
| 2008/0010204 A1 | 1/2008 | Rackley, III et al. |
| 2008/0010215 A1 | 1/2008 | Rackley, III et al. |
| 2008/0028395 A1 | 1/2008 | Motta et al. |
| 2008/0033817 A1 | 2/2008 | Billmaier et al. |
| 2008/0040265 A1* | 2/2008 | Rackley, III ........... G06Q 20/02 705/40 |
| 2008/0041938 A1 | 2/2008 | Wise |
| 2008/0046366 A1 | 2/2008 | Bemmel et al. |
| 2008/0052164 A1* | 2/2008 | Abifaker ................ G06Q 30/06 705/14.27 |
| 2008/0052169 A1 | 2/2008 | O'Shea et al. |
| 2008/0059318 A1 | 3/2008 | Packes et al. |
| 2008/0070690 A1 | 3/2008 | Van Luchene |
| 2008/0071620 A1 | 3/2008 | Lowe |
| 2008/0078831 A1 | 4/2008 | Johnson et al. |

(56) References Cited

U.S. PATENT DOCUMENTS

| | | |
|---|---|---|
| 2008/0091545 A1 | 4/2008 | Jennings, Jr. et al. |
| 2008/0097844 A1 | 4/2008 | Hsu et al. |
| 2008/0097851 A1* | 4/2008 | Bemmel et al. .............. 705/14 |
| 2008/0103972 A1 | 5/2008 | Lanc |
| 2008/0114699 A1 | 5/2008 | Yuan et al. |
| 2008/0126145 A1 | 5/2008 | Rackley, III et al. |
| 2008/0133351 A1 | 6/2008 | White et al. |
| 2008/0172306 A1* | 7/2008 | Schorr .............. G06Q 30/0613; 705/26.8 |
| 2008/0172331 A1* | 7/2008 | Graves .............. G06Q 20/347; 705/41 |
| 2008/0179395 A1 | 7/2008 | Dixon et al. |
| 2008/0195473 A1* | 8/2008 | Laramy .............. G06Q 30/02; 705/14.39 |
| 2008/0228597 A1 | 9/2008 | Sondles |
| 2008/0255942 A1 | 10/2008 | Craft |
| 2008/0273630 A1 | 11/2008 | Mege et al. |
| 2008/0290987 A1 | 11/2008 | Li |
| 2008/0319868 A1 | 12/2008 | Briscoe |
| 2009/0001159 A1* | 1/2009 | James .............. G06Q 20/351; 235/379 |
| 2009/0006116 A1 | 1/2009 | Baker |
| 2009/0030789 A1 | 1/2009 | Mashinsky |
| 2009/0037326 A1 | 2/2009 | Chitti |
| 2009/0055296 A1* | 2/2009 | Nelsen .............. G06Q 40/00; 705/30 |
| 2009/0076896 A1 | 3/2009 | Dewitt |
| 2009/0106115 A1 | 4/2009 | James |
| 2009/0111378 A1 | 4/2009 | Sheynman |
| 2009/0112709 A1 | 4/2009 | Barhydt et al. |
| 2009/0132415 A1 | 5/2009 | Davis et al. |
| 2009/0144161 A1 | 6/2009 | Fisher |
| 2009/0163263 A1 | 6/2009 | Herndon |
| 2009/0164329 A1 | 6/2009 | Bishop et al. |
| 2009/0171739 A1 | 7/2009 | De et al. |
| 2009/0171804 A1 | 7/2009 | Olliphant |
| 2009/0173782 A1 | 7/2009 | Muscato |
| 2009/0173784 A1 | 7/2009 | Yang |
| 2009/0187491 A1 | 7/2009 | Bull |
| 2009/0192904 A1 | 7/2009 | Patterson et al. |
| 2009/0192928 A1* | 7/2009 | Abifaker .............. G06Q 50/01; 705/35 |
| 2009/0197684 A1 | 8/2009 | Arezina |
| 2009/0210318 A1* | 8/2009 | Abifaker .............. G06Q 30/06; 705/26.1 |
| 2009/0240579 A1 | 9/2009 | Skowreonek |
| 2009/0247131 A1 | 10/2009 | Champion |
| 2009/0254432 A1 | 10/2009 | Mccaffery et al. |
| 2009/0254453 A1 | 10/2009 | Sanguinetti |
| 2009/0271253 A1* | 10/2009 | Arazy .............. G06Q 30/02; 705/41 |
| 2009/0281941 A1 | 11/2009 | Worth |
| 2009/0281951 A1 | 11/2009 | Shakkarwar |
| 2009/0287558 A1 | 11/2009 | Seth et al. |
| 2009/0298427 A1 | 12/2009 | Wilkinson |
| 2009/0327121 A1 | 12/2009 | Carroll |
| 2010/0005424 A1* | 1/2010 | Sundaresan ......... G06F 3/04815; 715/849 |
| 2010/0008535 A1 | 1/2010 | Abulafia |
| 2010/0010906 A1 | 1/2010 | Grecia |
| 2010/0041368 A1 | 2/2010 | Kumar |
| 2010/0042471 A1 | 2/2010 | Chang |
| 2010/0057554 A1 | 3/2010 | Lanford |
| 2010/0057580 A1 | 3/2010 | Raghunathan |
| 2010/0063906 A1* | 3/2010 | Nelsen .............. G06Q 20/363; 705/30 |
| 2010/0076833 A1* | 3/2010 | Nelsen .............. G06Q 20/06; 705/26.1 |
| 2010/0082487 A1* | 4/2010 | Nelsen .............. G06Q 20/351; 705/44 |
| 2010/0082490 A1 | 4/2010 | Rosenblatt |
| 2010/0088188 A1 | 4/2010 | Kumar et al. |
| 2010/0097180 A1 | 4/2010 | Cardullo |
| 2010/0130172 A1 | 5/2010 | Vendrow et al. |
| 2010/0131415 A1 | 5/2010 | Sartipi |
| 2010/0174993 A1 | 7/2010 | Pennington |
| 2010/0185505 A1 | 7/2010 | Sprogoe |
| 2010/0205063 A1 | 8/2010 | Mersky |
| 2010/0211431 A1* | 8/2010 | Lutnick et al. ................. 705/10 |
| 2010/0280921 A1* | 11/2010 | Stone .............. G06Q 30/0641; 715/765 |
| 2010/0293536 A1 | 11/2010 | Nikitin |
| 2010/0299194 A1 | 11/2010 | Snyder et al. |
| 2010/0299266 A1 | 11/2010 | Catania |
| 2010/0304852 A1 | 12/2010 | Szrek |
| 2010/0312636 A1 | 12/2010 | Coulter et al. |
| 2011/0004511 A1* | 1/2011 | Reich .............. 705/14.1 |
| 2011/0057027 A1 | 3/2011 | Grossman |
| 2011/0071913 A1 | 3/2011 | Chakiris et al. |
| 2011/0091092 A1 | 4/2011 | Nepomniachtchi |
| 2011/0106698 A1* | 5/2011 | Isaacson et al. ................. 705/41 |
| 2011/0161226 A1 | 6/2011 | Courtion |
| 2011/0166992 A1 | 7/2011 | Dessert et al. |
| 2011/0202419 A1 | 8/2011 | Mamdani |
| 2011/0234514 A1 | 9/2011 | Gothard |
| 2011/0246284 A1 | 10/2011 | Chaikin |
| 2011/0251962 A1 | 10/2011 | Hruska |
| 2011/0295749 A1* | 12/2011 | Scalisi .............. 705/44 |
| 2012/0060425 A1 | 3/2012 | Yamauchi et al. |
| 2012/0089467 A1 | 4/2012 | Comparelli |
| 2012/0099780 A1 | 4/2012 | Smith |
| 2012/0136780 A1 | 5/2012 | El-Awady |
| 2012/0203572 A1 | 8/2012 | Christense |
| 2012/0209688 A1 | 8/2012 | Lamothe et al. |
| 2012/0234911 A1 | 9/2012 | Yankovich |
| 2012/0245987 A1 | 9/2012 | Isaacson |
| 2012/0271689 A1 | 10/2012 | Etheredge |
| 2012/0284185 A1 | 11/2012 | Mettler |
| 2012/0303425 A1 | 11/2012 | Katzin |
| 2013/0073388 A1 | 3/2013 | Heath |
| 2013/0226728 A1 | 8/2013 | Oghittu |
| 2013/0290121 A1 | 10/2013 | Simakov |
| 2013/0304561 A1 | 11/2013 | Warner et al. |
| 2014/0006268 A1 | 1/2014 | Roberts |
| 2014/0019238 A1 | 1/2014 | Blatchley |
| 2014/0058873 A1 | 2/2014 | Sorenson |
| 2014/0074704 A1 | 3/2014 | White |
| 2014/0297437 A1 | 3/2014 | Natarajan |
| 2014/0164159 A1 | 6/2014 | Lovelace |
| 2014/0081769 A1 | 11/2014 | Wilen |
| 2014/0279187 A1 | 11/2014 | Gopinath |
| 2015/0066757 A1 | 3/2015 | Shenoy |
| 2015/0178701 A1 | 6/2015 | Glass |
| 2015/0278845 A1 | 10/2015 | Sorem et al. |
| 2017/0076293 A1 | 3/2017 | Cage |

FOREIGN PATENT DOCUMENTS

| | | |
|---|---|---|
| EP | 1519332 A1 | 3/2005 |
| EP | 2128809 A1 | 12/2009 |
| GB | 2333878 A | 8/1999 |
| JP | 2002189963 A | 7/2002 |
| JP | 2002318951 | 10/2002 |
| JP | 2002318951 A | 10/2002 |
| JP | 2003208541 A | 7/2003 |
| KR | 10-2001-0106187 A | 11/2001 |
| KR | 20040028487 | 4/2004 |
| KR | 20040028487 A | 4/2004 |
| KR | 20040052531 A | 6/2004 |
| KR | 1020040052502 | 6/2004 |
| KR | 1020040052502 A | 6/2004 |
| KR | 20040069294 | 8/2004 |
| KR | 20040069294 A | 8/2004 |
| KR | 10-2005-0118609 A | 12/2005 |
| KR | 20090123444 A | 12/2009 |
| WO | 0231708 A | 4/2002 |
| WO | 2004/012118 A1 | 2/2004 |
| WO | 2004012118 A1 | 2/2004 |
| WO | 2005036432 A | 4/2005 |
| WO | 2005111882 A1 | 11/2005 |
| WO | 2008/005018 A2 | 1/2008 |

(56) References Cited

FOREIGN PATENT DOCUMENTS

| | | |
|---|---|---|
| WO | 2008005018 A | 1/2008 |
| WO | 2013078499 A1 | 6/2013 |

OTHER PUBLICATIONS

ISA Korean Intellectual Property Office, International Search Report of PCT/US2009/058111, dated May 26, 2010, 3 pages.
ISA United States Patent and Trademark Office, International Search Report of PCT/US2008/073910, dated Nov. 10, 2008, 3 pages.
ISA Korean Intellectual Property Office, International Search Report of PCT/US2010/060875, dated Jul. 29, 2011, 10 pages.
Eazel, William, "Paypal intros SMS Payments," http://www.v3.co.uk/articles/print/2152694, vnunet.com, Mar. 24, 2006, 1 page.
Nelsen, David A., "Systems and Methods for Reassignment of a Virtual Card," U.S. Appl. No. 13/107,654, filed May 13, 2011, 49 pages.
Nelsen, David A., "Systems and Methods to Manage and Control Use of a Virtual Card," U.S. Appl. No. 13/158,349, filed Jun. 10, 2011, 62 pages.
ISA European Patent Office, Extended European Search Report of EP0981328, dated Jul. 4, 2012, Germany, 6 pages.

\* cited by examiner

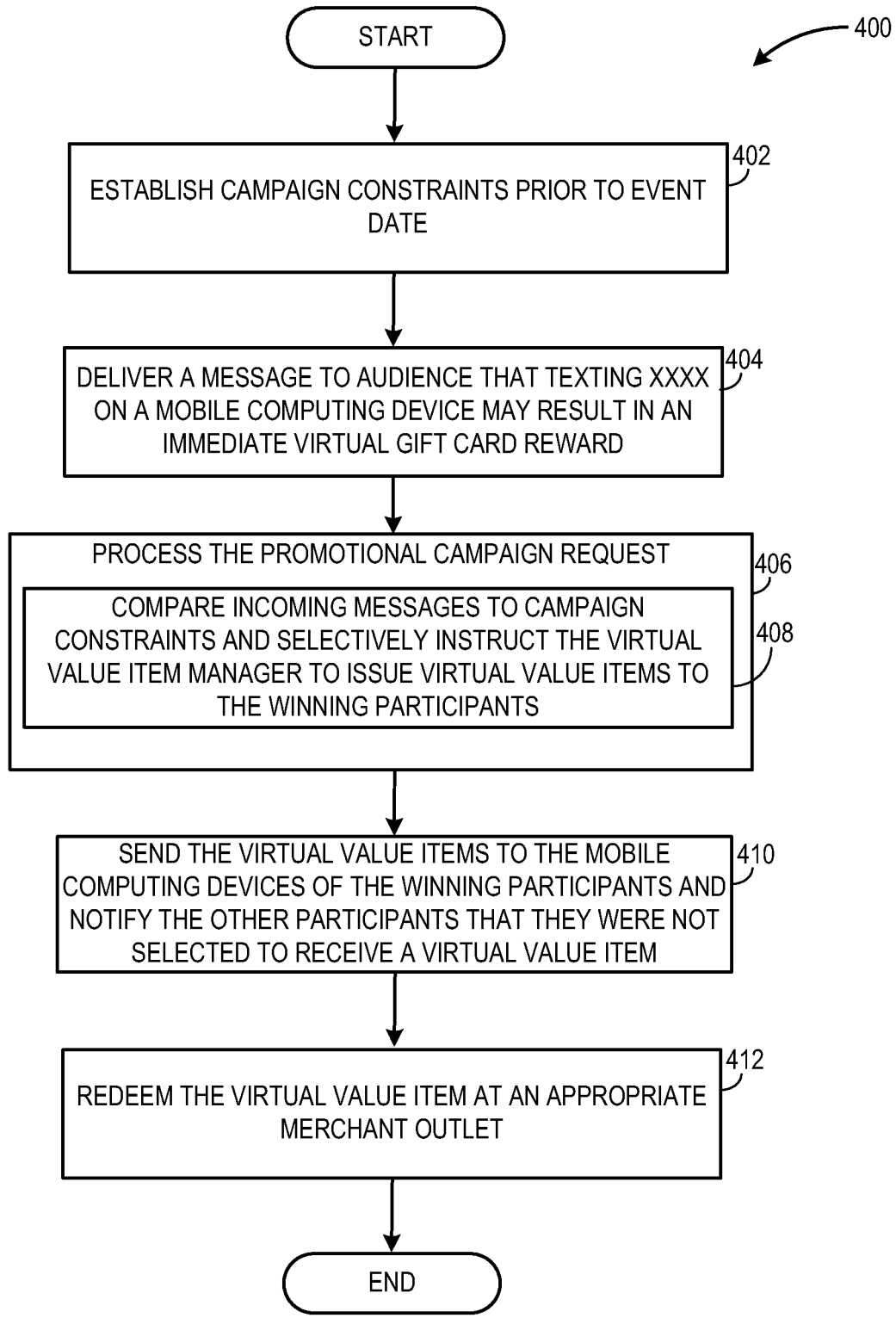

SYSTEMS AND METHODS FOR GENERATING A VIRTUAL VALUE ITEM FOR A PROMOTIONAL CAMPAIGN

CROSS-REFERENCE TO RELATED APPLICATIONS

This application claims priority to U.S. Provisional Patent Application No. 61/287,105 filed Dec. 16, 2009 entitled "SYSTEMS AND METHODS FOR GENERATING A VIRTUAL VALUE ITEM FOR A PROMOTIONAL CAMPAIGN" the entire contents of which are hereby incorporated herein by reference for all purposes.

FIELD

The present disclosure relates generally to systems and methods for automating a promotional campaign, and more particularly to systems and methods for generating a virtual value item within an established virtual value system based on instructions from a promotional campaign engine.

BACKGROUND AND SUMMARY

Businesses may launch contests, drawings, lotteries, or other promotional campaigns to generate publicity. In some promotional campaigns, participants may physically fill out entry slips to join a promotional campaign. Subsequently, the entry slips may be processed and a set of participants may be selected to receive prizes such as coupons, gifts, gift cards, vouchers, or other promotional items. The promotional items may be constructed, printed, etc., and then distributed to the selected participants. In many circumstances, the promotional items may be mailed through a physical mailing service or handed out by workers employed in the promotional campaign.

The inventors have recognized several problems with the promotional campaign described above. Physically processing the entry slips as well as distributing the promotional items through a physical mailing service or handing out the promotional items is inefficient and costly. It may take hours or even days to provide a selected participant with a promotional item after the participant has joined the promotional campaign. Moreover, consumers may choose not to participate in the promotional campaign due to the inefficient methods used to process the entry slips and distribute the promotional items, thereby undermining the campaign's effectiveness.

The present disclosure provides systems and methods for automating a promotional campaign through a promotional campaign engine. In one example a promotional system for generating a virtual value item for a promotional campaign is provided. The promotional system includes a virtual value system configured to generate at least one virtual value item and a promotional campaign engine communicatively linked to the virtual value system. The promotional campaign engine includes a campaign set-up module configured to generate a campaign rule set defining one or more parameters of the promotional campaign and a requesting module configured to generate and send at least one virtual value item request to the virtual value system. Each virtual value item request includes code executable to request generation of a virtual value item, request generation of at least one associative virtual value item profile in the virtual value system, and initiate delivery of the virtual value item to a mobile computing device of a participant.

In this way, the promotional system increases the efficiency of a promotional campaign through automation of various aspects of the promotional campaign when compared to other systems which physically distribute promotional campaign items. Moreover, the participant may be provided with a virtual value item via their mobile computing device in a relatively short duration when compared to other promotional systems that physically distribute items to selected entrants.

In one example, the promotional campaign engine may be configured to receive a plurality of campaign entries for the promotional campaign from a plurality of mobile computing devices and where the promotional campaign engine further includes a selection module configured to select a set of mobile computing devices to which virtual value items are sent. Each mobile computing device included in the set of mobile computing devices may be associated with a virtual value item request sent to the virtual value system. In this way, the promotional system automates additional aspects of the promotional campaign, further increasing the efficiency of the promotional campaign when compared to other systems which physically process paper entry slips.

BRIEF DESCRIPTION OF THE FIGURES

FIG. 4 shows a use case scenario for managing a promotional campaign.

DETAILED DESCRIPTION

Figure 1:
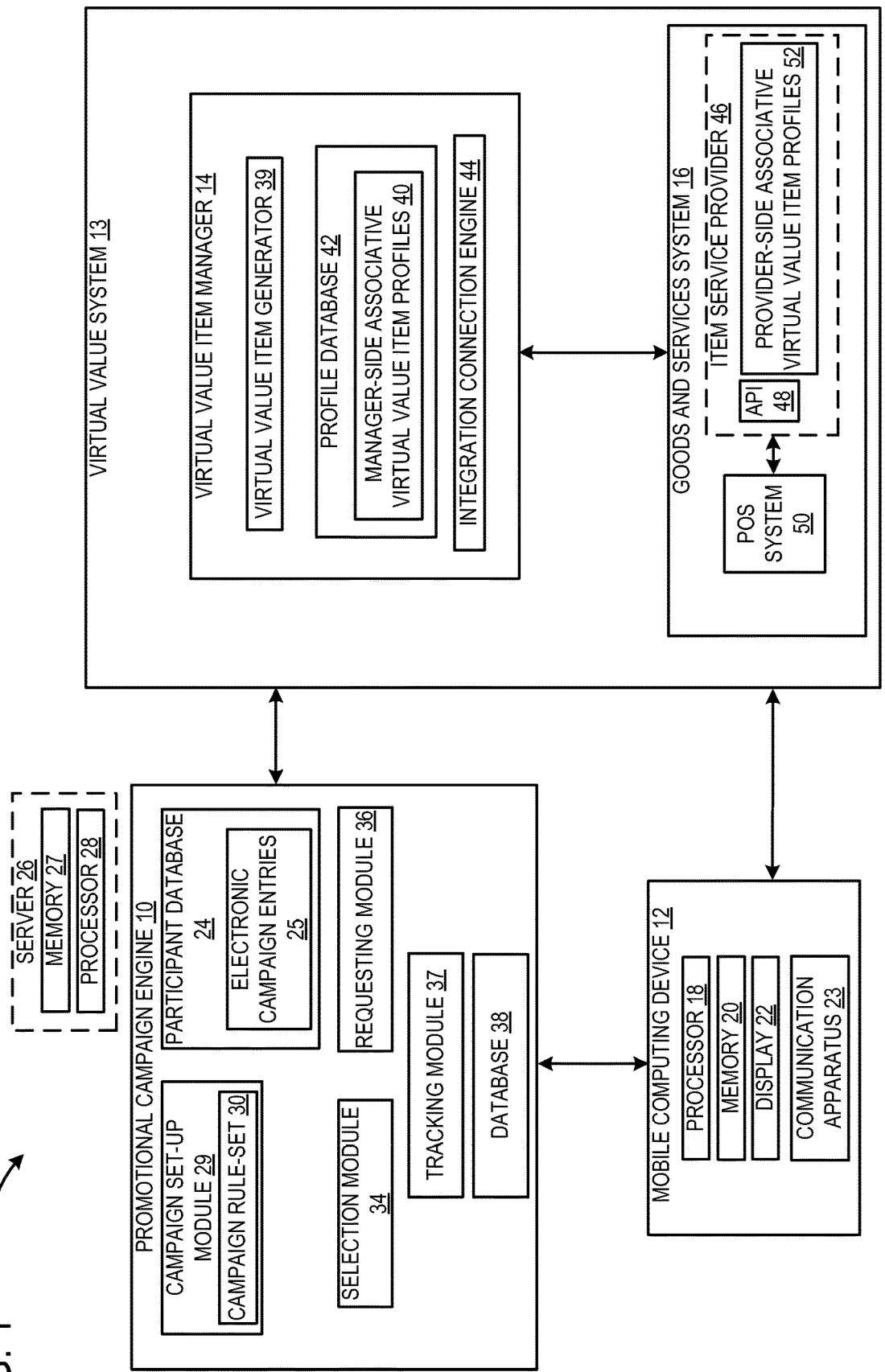
FIG. 1 shows a schematic depiction of a promotional system.

Systems and methods for implementing a promotional campaign are provided in the following description. A promotional campaign, as used herein, is a merchant or event promotion where participants submit participant information in exchange for a potential return of a promotional item. In one example a promotional system may include a virtual value system configured to generate at least one virtual value item and a promotional campaign engine communicatively linked to the virtual value system. The promotional campaign engine may include a campaign set-up module configured to generate a campaign rule set defining one or more parameters of the promotional campaign and a requesting module configured to generate and send at least one virtual value item request to the virtual value system. Each virtual value item request may include code executable to request generation of a virtual value item, request generation of at least one associative virtual value item profile in the virtual value system, and initiate delivery of the virtual value item to a mobile computing device of a participant. In this way, virtual value items (e.g. vouchers, prizes) may be quickly distributed to selected mobile computing devices of participants, enabling the promotional campaign to be carried out inexpensively and efficiently.

A virtual value item as used herein may be an electronically-issued and/or electronically maintained value item. A virtual value may be any type of privilege, monetary or non-monetary. For example, a virtual value item may be a stored value card which may include, but is not limited to, a virtual gift card, a virtual loyalty card, a virtual rewards card, a prepaid card, or another suitable virtual card that holds prepaid value. The stored value card may have monetary or other forms of value stored on the virtual card. In another example, a virtual value item may be a virtual membership card where such stored value includes membership privileges. An example of virtual membership cards may include, but are not limited to club cards, promotional cards, etc. Still further in some examples a virtual value item may be a virtual voucher that may be exchanged for a good and/or service or a virtual coupon that can be used for a financial discount or rebate when purchasing a good and/or service. The electronic issuance and maintenance of the virtual value item enables a multitude of advantages when compared to physical value items (e.g., plastic gift cards, paper coupons, paper vouchers, etc.). For example, the likelihood of loss and theft of the virtual value item may be reduced when an electronically issued and maintained virtual value items are used. Additionally a virtual value item may be delivered to a selected recipient (e.g., a mobile computing device) faster than delivering a physical value item (e.g., plastic gift card, paper voucher, etc.) through a postal carrier, courier, etc. Moreover, a virtual value item may be electronically generated much faster than a physical value item.

FIG. 1 illustrates a schematic depiction of a promotional system 1 for implementing a promotional campaign such as a lottery, drawing, or contest. The promotional system includes a promotional campaign engine 10, a mobile computing device 12, and a virtual value system 13. Virtual value system 13 may include a virtual value item manager 14 and/or a goods and services system 16 (also referred to generally as the merchant).

Mobile computing device 12 may be any suitable computing device configured to communicate with promotional campaign engine 10 as well as virtual value system 13. For example, the mobile computing device may be a smart phone, a hand-held computing device, an advanced PC-like capable mobile device, a laptop computer, a portable media player, etc. In some embodiments, the mobile computing device may run an identifiable operating system's software and provide a standardized interface and platform for applications. The mobile computing device may include a processor 18, memory 20 executable by the processor, a display 22, and a communication apparatus 23. Processor 18 may be configured to execute various programs, routines, etc., stored in memory 20.

Mobile computing device 12 may be configured to generate and send an electronic campaign entry to the promotional campaign engine 10. The electronic campaign entry may be submitted through a communication platform. For example, the communication platform may be email, text messaging, instant messaging or other suitable communication platform. Accordingly, the mobile computing device may be networked to one or more networks, such as a public network (e.g., the Internet, a wireless phone network), a private network (e.g., virtual private network), etc. Although a single mobile computing device is shown, it will be appreciated that a plurality of mobile computing devices may send electronic campaign entries to promotional campaign engine 10. The electronic campaign entries may include various types of data such as a mobile phone number of the participant, a participant's name, a participant's contact information, and/or a participant's survey responses. In this way, various data may be gathered upon submission of an electronic campaign entry, enabling a merchant to gather data regarding a consumer (i.e., the participant). The data associated with the consumer may then be used by the merchant to develop marketing strategies or sold to a $3^{rd}$ party.

The promotional campaign engine may also include a participant database 24 configured to store a plurality of electronic campaign entries 25 sent from a plurality of mobile computing devices and/or other information pertaining to the participants in the promotional campaign. As previously discussed the electronic campaign entries may include participant information such as a mobile phone number, a participant's name, a participants contact information, and a participant's survey response. In some examples, the merchant may be permitted access to the participant database, allowing the merchant to review participant data. However in other examples, the merchant may not be permitted access to the participant database to preserve the anonymity of the participants. Moreover, the participant may allow or not allow a merchant to view their information when entering the campaign. In this way, the participant is provided with the choice of preserving their anonymity.

Promotional campaign engine 10 is configured to manage a promotional campaign. Furthermore, promotional campaign engine 10 may be executed on at least one server 26. The server may include memory 27 executable by a processor 28. It will be appreciated that in other examples the promotional campaign engine may be executed via a plurality of communicatively linked servers, each server including memory and a processor.

Management of the promotional campaign may include receiving and processing electronic campaign entries from a plurality of mobile computing devices, selecting mobile computing devices (e.g., winning participants) to which virtual value items are distributed, and requesting generation of virtual value items and associative virtual value item profiles in virtual value system 13. Therefore, management of at least a portion of the promotional campaign is automated, thereby increasing the efficiency of promotional system 1. In this way, virtual value items may be distributed to the winning participants much faster than in promotional campaigns that physically distribute (e.g., hand out, distribute through a mail carrier, etc.) physical value items (e.g., plastic gift cards, paper coupons, paper vouchers, physical prizes, etc.).

As discussed above, a virtual value item may be a virtual gift card, a virtual voucher, a virtual coupon, or other suitable virtual item. Furthermore, the virtual value item may be stored on a computing device and retain stored value that may be used in a virtual value transaction in which the value is adjusted (e.g., decreased) in exchange for at least one of a good and a service, discussed in greater detail herein. It will be appreciated that the virtual value item may be a file stored in memory on mobile computing device 12. Various information enabling the user of the mobile computing device (e.g., a participant) to use the virtual value item in a virtual value transaction may be stored in the file such as a bar code, a promotional item number, a value (e.g., monetary) of the item, redemption locations, etc. The virtual value item may include additional data such as audio data, video data, graphic data, etc.

A suitable communication platform may be used to facilitate communication between promotional campaign engine 10 and virtual value system 13. Example communication platforms include a network such as the Internet, a virtual private network (VPN), a wireless phone network, etc. In some examples, the promotional campaign engine and virtual value system may be in remote locations. However in other examples, the promotional campaign engine may be integrated into virtual value system 13.

The promotional campaign engine may include a number of modules configured to carry out various functions of a promotional campaign. Specifically the promotional campaign engine may include campaign set-up module 29. The campaign set-up module may be configured to generate a campaign rule set 30 including constraints and/or parameters outlining various aspects of the promotional campaign. A director, employed within the goods and services system, may access the campaign set-up module, allowing the director to tailor a promotional campaign according to the needs of the promotional campaign. However, it will be appreciated that in some embodiments, a third party, such as a campaign organizer employed as a contractor by goods and services system 16, may also be able to access the campaign set-up module.

In some examples, the parameters included in the rule set 30 may be related to entry procedures for the promotional campaign. Specifically, the rule set may include the information requested and in some cases necessitated in an electronic campaign entry. For example, the merchant may request or necessitate an entry fee, a participant's consent (e.g., terms of participation agreement), and/or the identification information (e.g., name, phone number, email address) from the participant to enter the promotional campaign. A revenue stream for the merchant may be generated when an entry fee is requested or required for participation in a promotional campaign. The identification information may be participant information which may be provided as a result of entry into the promotional campaign. Therefore campaign set-up module 29 may be configured to generate various entry parameters entered by a person associated with the promotional campaign, such as a campaign organizer. Further, in some examples, campaign rule set 30 may include one or more of the following parameters: the quantity of selected virtual value item recipients (e.g., winners), the quantity of the virtual value items distributed, the type of virtual value items distributed, the number of entries per participant, the total stored value of the virtual value items provided to selected recipients in the promotional campaign, the constraints of the stored value item usage (e.g., the location(s) where a virtual value item can be used in a virtual value transaction, the time period during which the virtual value item can be used), the length of the promotional campaign, a value assigned to a virtual value item (e.g., "prize"), virtual value item gradations (e.g., "prize levels"), and the terms and conditions of the promotional campaign.

Further, in some examples, the promotional campaign may be dynamic in nature. In other words, the parameters of the promotional campaign may be adjusted during implementation of the promotional campaign based on certain criteria such as the number of applicants, the time of entry of the applicants, etc. For instance, the length of a promotional campaign may be adjusted based on the number of campaign entries. As another example, the value of the virtual value item, number of virtual value items, and gradations for virtual value items, if used, may also be dynamically adjusted depending on the number of campaign entries.

Additionally, campaign set-up module 29 may be configured to establish the method used to select the recipients of virtual value items (e.g., mobile computing devices selected to receive a virtual value item) in the promotional campaign. In other words, the campaign rule set may define the method for establishing the mobile computing devices that receive virtual value items. For example, a merchant may designate through the campaign set-up module that each participant in the promotional campaign receives a virtual value item or that each $10^{th}$ or $100^{th}$ participant receives a virtual value item. In other examples, the first n number of campaign entries may be selected. In other systems, a random set of campaign entries may be selected. It will be appreciated that other suitable selection schemas may be utilized in other embodiments.

Promotional campaign engine 10 may manage a plurality of promotional campaigns. In some examples the types of parameters included in the rule sets may vary. For example, a first rule set associated with a first merchant may include the quantity of virtual value item recipients and a second rule set associated with a second merchant may include the quantity of virtual value item recipients, the quantity of the virtual value items distributed, and the number of campaign entries per participant.

The promotional campaign engine may further include a selection module 34 configured to select a set of mobile computing devices to which at least one virtual value item is sent based on campaign rule set 30. The set of mobile computing devices may be selected from the plurality of electronic campaign entries 25 stored in participant database 24. In other words the selection module may select "winners" of the promotional campaign. Specifically in one example, the selection module may be configured to randomly select a predetermined number of mobile computing devices slated to receive a virtual value item. It will be appreciated the selection schema may be defined by campaign rule set 30.

The promotional campaign engine may further include a requesting module 36 configured to generate and send virtual value item requests to virtual value item manager 14. A virtual value item request may include commands instructing the virtual value item manager to generate a virtual value item. The promotional campaign manager may also include a tracking module 37 configured to track the actions performed by promotional campaign engine 10. The actions may include various command, programs, etc., executed via server 26. Specifically the actions may be performed by selection module 34, requesting module 36, and/or campaign set-up module 29. The tracking module may be configured to store the tracking data in a database 38. However in other examples, the tracking data may be stored in participant database 24. In this way, the merchant can review the promotional campaign if errors or inconsistencies arise.

Virtual value system 13 may be configured to enable implementation of virtual value transactions. In particular, the virtual value system may generate virtual value items and associative virtual value item profiles as well as adjust value data within the associative virtual value item profiles. Virtual value transactions are discussed in greater detail herein.

The virtual value system includes virtual value item manager 14 configured to manage a plurality of virtual value items. The virtual value item manager may be executed on server 26 or alternatively may be executed on another suitable server including memory executable by a processor. The virtual value item manager may include a virtual value item generator 39 configured to generate virtual value items as well as corresponding manager-side associative virtual value item profiles 40. Therefore, each virtual value item generated by the virtual value item generator may have a corresponding manager-side associative virtual value item profile. The virtual value items may be generated via virtual value item generator 39 based on requests from promotional campaign engine 10 as well as requests from goods and services system 16. In this way, virtual value items may be generated in response to requests from multiple parties. Data, such as value data (e.g., monetary value data), may be included in each manager-side associative virtual value item profile. Moreover, each manager-side associative virtual value item profile may also include identification data such as an ID number, a phone number or other unique identifiers linking a mobile computing device to the manager-side associative virtual value item profile. It will be appreciated that the data provided in the manager-side associative virtual value item profiles may vary. Furthermore, the manager-side associative virtual value item profiles may be stored in a profile database 42.

Virtual value item manager 14 may include an integration connection engine 44 configured to communicatively link virtual value item manager 14 with goods and services system 16. In particular, the integration connection engine may be configured to communicatively link virtual value item manager 14 with at least one item service provider 46, discussed in greater detail herein, via an application program interface (API) 48 or other software communication standard included in the item service provider. In this way, virtual value item manager 14 may communicate with item service provider 46. When a plurality of item service providers are communicatively linked to virtual value item manager 14, at least a portion of the item service providers may utilize different communication protocols, communication hardware, security protocols, etc. Thus, integration connection engine 44 allows the virtual value item manager to interact with a number of different item service providers. In other embodiments, the item service provider may wish to use an API or other software provided by the virtual item manager to enable communication. In further examples, item service provider 46 may include other methods or systems for communicating with the virtual value item manager.

Additionally, it will be appreciated that integration connection engine 44 may include at least one virtual item adapter configured to modify the data sent to and received from goods and services system 16 into a common programming language, such as Extensible Markup Language (XML). However, in other embodiments the integration connection engine 44 may not include a virtual item adapter.

As used herein, goods and services system 16, as noted above also generally referred to as a merchant, may be a system configured to manage electronic transactions such as virtual value transactions. As such, the merchant may be the store selling or providing goods and/or services that desires to have virtual value transactions in which goods and/or services are exchanged for virtual value items (e.g., virtual gift cards, virtual vouchers, etc.). In the depicted example, goods and services system 16 includes item service provider 46 which may be a third party service or provider that represents a virtual value item or other item services on behalf of a select goods and services system. However in other examples, the item service provider may not be included in the goods and services system. The item service provider may be a third party stored value company, a module or software component of the merchant's existing Point of Sale (POS) software and/or provider, and/or application or software purchased, created, or used by the goods and services system to track the virtual value items services on behalf of the goods and services system.

The goods and services system may include a POS system 50 which may include software and hardware to manage electronic transactions. An electronic transaction may include a transaction in which stored value in virtual value item or other item holding value (e.g., cash, credit card, check card, etc.) is used to purchase a good and/or a service. An electronic transaction in which stored value in a virtual value item is used to purchase a good and/or a service may be referred to as a virtual value transaction.

It will be appreciated that the goods and services system may be associated with one or more merchant outlets. The merchant outlets may include one or more coffee shops, fast food restaurants, hotels, supermarkets, etc. Therefore, the goods and services system 16 may process an electronic transaction at a brick and mortar location, in some examples. However, in other examples the goods and services system may process electronic transactions over the Internet or other suitable communication platform.

In some embodiments, goods and services system 16 may directly manage and control virtual value transactions. In other words, item service provider 46 may be included in the goods and services system. However, in other embodiments, the goods and services system may use an external item service provider. Thus, a third party item service provider may be used in some embodiments. The item service provider may enable the goods and services system to perform virtual value transactions. As an example, the third party item service provider may be the software and hardware configured to perform electronic transaction on behalf of a selected goods and services system. As discussed above, the third party item service provider may include both hardware and software, which among other things, may be configured to electronically process virtual value transactions.

It will be appreciated that virtual value transactions may include a transactions in which the stored value of a virtual value item is adjusted (e.g. decreased or in some situations increased) in exchange for at least one of a good and a service, as discussed above. Therefore the adjustment of the value of a virtual value item may include setting the item's stored value to 0. The stored value may be in the virtual value item itself, in the manager-side associative virtual value item profile, and/or the provider-side associative virtual value item profile, discussed in greater detail herein. Therefore, a virtual value transaction may include communication between two systems, devices, etc., in which value data is manipulated. For example, a virtual value transaction may include deducting value from a virtual value item in exchange for a good or service at a merchant outlet. Further, in other examples a virtual value transaction may include implementation of security protocols. Virtual value item manager 14 may be configured to manage various security features of virtual value items, such as virtual value cards. The security features may include selective enablement (e.g., access control via authentication) of the virtual value item. Thus, a virtual value transaction may include selectively enabling a virtual value item, such as a virtual value card. Example security features of a virtual value card manager are disclosed in provided in U.S. application Ser. No. 12/554,792 filed Sep. 4, 2009 entitled SYSTEMS AND METHODS FOR AUTHENTICATION OF A VIRTUAL STORED VALUE CARD. The entire contents of which are hereby incorporated herein by reference for all purposes.

As briefly mentioned above, item service provider 46 may be a third party stored value system or a module or software component of the goods and services system's existing POS system created or used by the goods and services system to track the virtual item services on behalf of the goods and services system. A goods and services system's POS Provider may be software, hardware, and/or other devices configured to process goods and services transactions at a location. Often times the POS may have a module or built in capability, thus making the POS System also an "Item Service Provider".

Item service provider 46 may be configured to generate a plurality of provider-side associative virtual value item profiles 52, each associative virtual value item profile corresponding to a virtual value item. The provider-side associative virtual value item profiles may include value data (e.g. monetary value data, point value data), identification (ID) data (e.g. ID number, personal identification numbers), etc. A selected provider-side associative virtual value item profile may be accessed and adjusted during a virtual value transaction. It will be appreciated that the provider-side associative virtual value item profiles may be included in the goods and services system, in some embodiments. Furthermore it will be appreciated that the manager-side associative virtual value item profiles may be accessed and adjust in response to adjustment of the provider-side associative value item profiles.

Figure 2:
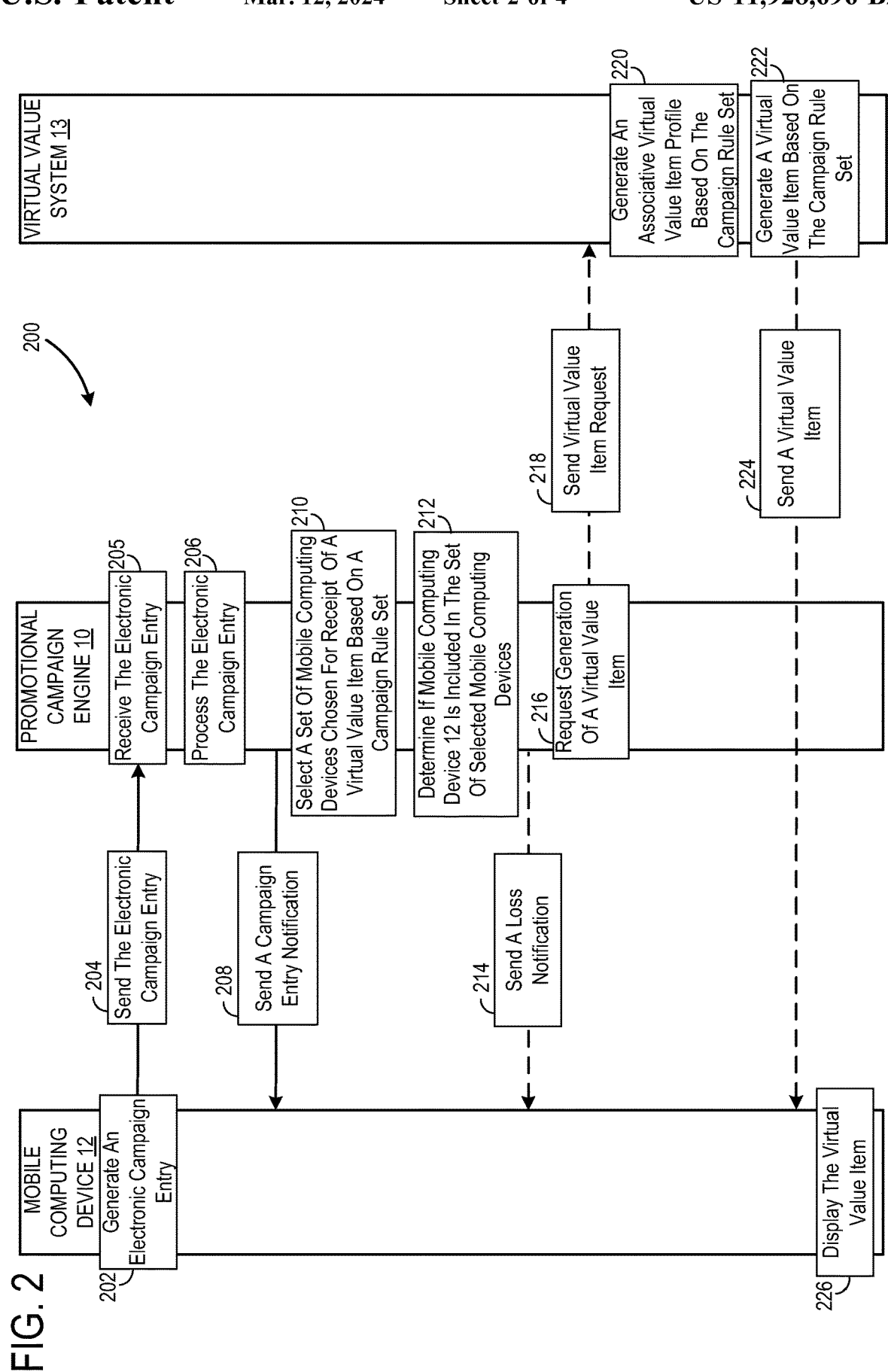
FIG. 2 shows an example process flow of a method for managing a promotional campaign.

FIG. 2 illustrates an embodiment of a method 200 for use in communication between mobile computing device 12, promotional campaign engine 10, and virtual value system 13, shown in FIG. 1. Method 200 may be used to manage a promotional campaign. As depicted method 200 is implemented using the hardware and software components of promotional system 1 described above. However, in other embodiments method 200 may be implemented by other suitable hardware and software components. Furthermore it will be appreciated that method 200 may be implemented in real-time in some embodiments. In this way, a promotional campaign may be quickly implemented when compared to other promotional campaigns which may construct and/or physically distribute physical value items (e.g., plastic gift cards, paper vouchers, physical goods, etc.).

At 202 the method includes generating an electronic campaign entry via the mobile computing device. The electronic campaign entry may include a predetermined alpha-numeric message (e.g., a short code) as well as a phone number, email address, etc., specifying the recipient of the electronic campaign entry. The phone number or email address may be associated with the promotional campaign engine. The electronic campaign entry may also include identification information associated with the participant such as the participant's email address, phone number, name, etc. In some examples the electronic campaign entry may also include a survey completed by the participant. However in other examples the electronic campaign entry may not include a survey.

At 204, the method includes sending the electronic campaign entry to the promotional campaign engine from the mobile computing device. In some examples the electronic campaign entry may be sent via text message, email, or an instant messaging service. However in other examples, the electronic campaign entry may be sent through another suitable communication platform.

At 205, the method includes receiving the electronic campaign entry at promotional campaign engine 10. As previously discussed, promotional campaign engine 10 may receive a plurality of electronic campaign entries. Therefore in some examples method 300 may further include receiving a plurality of campaign entries from a plurality of mobile computing devices of participants via the promotional campaign engine.

At 206, the method includes processing the electronic campaign entry via the promotional campaign engine. Processing the electronic campaign entry may include storing the electronic campaign entry in the participant database. In this way, the user of the mobile computing device may be designated as a participant in the promotional campaign.

At 208, the method includes sending a campaign entry notification from the promotional campaign engine to the mobile computing device. In this way, the participant may be informed that the electronic campaign entry has been received and processed by the promotional campaign engine. The campaign entry notification may keep the participant engaged in the promotional campaign. Therefore, consumers may be incentivized to participate in the promotional campaign due to the prompt entry notification.

At 210, the method includes selecting a set of mobile computing devices chosen for receipt of a virtual value item based on a campaign rule set. It will be appreciated that the set of mobile computing devices may be selected from a plurality of mobile computing devices stored in the participant database. As discussed above the campaign rule set may include various constraints outlining the way in which the mobile computing devices are selected. For example, the campaign rule set may dictate that all of the participants in the promotional campaign receive a virtual value item or that the first 10 participants in the promotional campaign receive a virtual value item.

At 212, the method includes determining if mobile computing device 12 is included in the set of selected mobile computing devices. If the participant is not included in the set of virtual value item recipients, the method includes at 214 sending a loss notification to mobile computing device 12 from the promotional campaign engine. It will be appreciated that the loss notification may include data, such as text, graphics, audio, video, etc., for notifying the user of the mobile computing device that they have not been selected to receive a virtual value item. Moreover, the loss notification may be in the form of an email, text message, etc., in some examples.

However, if it is determined that mobile computing device 12 is included in the set of selected mobile computing devices, the method includes at 216 requesting generation of a virtual value item and at 218 sending a virtual value item request to virtual value system 13 from promotional campaign engine 10. The virtual value item request may include data configured to request generation of a virtual value item via the virtual value system. In some examples, generation of both a manager-side associative virtual value item profile and a provider-side associative virtual value item profile may be included in the virtual value item request. In some examples, step 216 may include requesting generation of a virtual value item for each of the mobile computing devices included in the selected set of mobile computing devices and step 218 may include sending a virtual value item request to the virtual value system from the promotional campaign engine for each of the mobile computing devices included in the selected set of mobile computing devices.

At 220, the method includes generating an associative virtual value item profile within the virtual value system based on the campaign rule set. In some examples, both a provider-side associative virtual value item profile and a manager-side associative virtual value item profile may be generated. Further in some examples step 220 may include generating an associative virtual value item profile in virtual value system 13 for each of the virtual value item requests. It will be appreciated that in some examples, generating an associative virtual value item profile may include generating value data corresponding to a virtual value item. At 222, the method includes generating a virtual value item based on the campaign rule set in virtual value system 13. Further in some examples, step 222 may include generating a virtual value item for each of the virtual value item requests based on the campaign rule set.

At 224, the method includes sending the virtual value item to mobile computing device 10 from virtual value system 13. In some examples the virtual value item may be sent programmatically such that it is sent automatically based on the rule set without additional intervention from external sources. Further in some examples, the virtual value item may be sent first to promotional campaign engine 10 from virtual value system 13 and then subsequently sent to mobile computing device 10. Further in some examples step 224 may include sending each of the mobile computing devices included in the selected set of mobile computing devices a virtual value item from the virtual value system or the promotional campaign engine. As depicted the virtual value item is sent through the promotional campaign engine to the mobile computing device. However, in other embodiments the virtual value item may be sent directly to the mobile computing device from the virtual value system.

At 226, the method includes displaying the virtual value item on mobile computing device 10. It will be appreciated that in some embodiments, the virtual value item may be displayed and subsequently scanned by a bar code reader or other suitable apparatus in a goods and services system to implement a virtual value transaction. Method 200 enables a promoter to quickly and inexpensively distribute virtual value items to campaign participants through the participant's mobile computing devices. Additionally, participants may quickly provide entry into the campaign. Moreover, a promoter may also quickly and efficiently gather marketing data which may be requested or required upon campaign entry. It will be appreciated that this method of gathering electronic campaign entries may be less expensive than other method such as physically collecting paper entries. Moreover, the duration between campaign entry and outcome notification can be greatly reduced and in some cases carried out instantaneously decreasing the likelihood of a participant losing interest in the promotional campaign.

Figure 3:
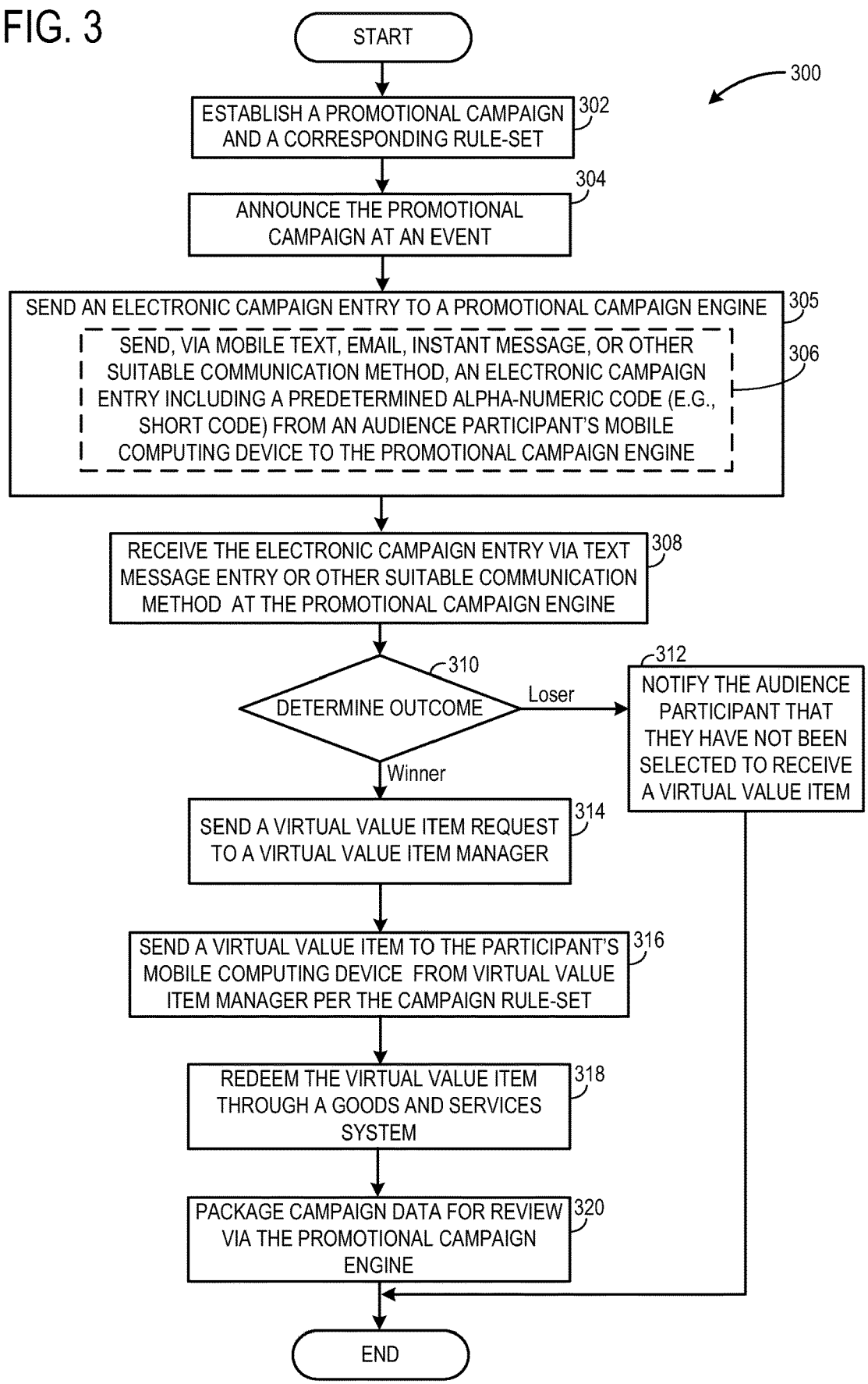
FIG. 3 shows another example process flow of a method for managing a promotional campaign.

Turning now to FIG. 3, an example process flow of a method 300 for managing a promotional campaign according to an embodiment of the present disclosure is shown. It will be appreciated that the process flow is exemplary in nature and that numerous other process flows may be used in other examples.

The method includes at 302 establishing a promotional campaign and a corresponding campaign rule set. In some examples the merchant may establish the promotional campaign and the corresponding campaign rule set. The corresponding campaign rule set may include various parameters or constraints defining different aspects of the promotional campaign. In particular, the campaign rule set may define the way in which the virtual value items are generated and distributed as well as the way in which the entry requests from the campaign participants are managed, as discussed above.

An Exemplary Promotional Campaign Rule Set may be as Follows:
  Merchant Event: Basketball game
  Prize: 200—$25 gift cards to audience participants
  Short Code to text: 34795
  Or email: 34795@mail.com
  OR IM: 34795@mail.com
  Gift Card merchant location: Useable at approved vending locations in event arena
  Campaign Length: 7:30 pm to 7:45 pm, Dec. 23, 2009
  Entry Cost: $0
  Participation constraints: One entry per participant
  Notification of prize: As soon as possible based on event constraints Another Exemplary Promotional Campaign Rule Set may be as Follows:
  Merchant Event: Rock Concert
  Prize: $15 gift card to each $1000^{th}$ entrant
  Short Code to text: 35799
  Merchant location: Useable at participating restaurants; BIG BURGER
  Entry cost: 99 cents
  Proceeds: Donation to A Homeless Charity
  Campaign Length: Till 20,000 entries have been received or till midnight, Aug. 27, 2009
  Participation constraints: maximum of 3 entries per participant
  Notification of prize: At end of campaign length Next at 304 the method includes announcing the promotional campaign at an event (e.g., a sporting event, musical event, theatrical event, via television, etc.). In some examples, the announcement may be made over a loudspeaker, a large screen television (e.g., a jumbotron) or presented on a billboard or in pamphlets. Further in some examples the campaign announcement may be sent directly to a plurality of portable computing devices, presented on a website, and/or presented in a television or radio commercial. The announcement may convey to a consumer the details of the promotional campaign. For example, the announcement may include the virtual value items (e.g., prizes) given to the participants, entry details (e.g., phone number, email, text code, etc.), the length of the promotional campaign, the cost of entry, the participating merchant outlets, data required for entry, etc.

In some examples when the promotional campaign is a charity campaign, the cost of entry may be a specified amount and the virtual value item may have a monetary value corresponding to the specified cost of entry. In such examples, each entry may be a winner on at least a base level. For example, a campaign may cost $5 to participate in and may return a $5 virtual gift card immediately to a participant to be used at the event. Such a system may be used where a sponsor is running a campaign and giving proceeds to a charity or not-for-profit contribution.

Next at 305, the method includes sending an electronic campaign entry to a promotional campaign engine. Sending an electronic campaign entry to the promotional campaign engine may include, at 306, sending an electronic campaign entry, via mobile text, email, instant message, or other suitable communication method, from an audience participant's mobile computing device to the promotional campaign engine. The electronic campaign entry may include an identifier, such as but not limited to a predetermined alpha-numeric code (e.g., short code), a mobile number or mobile number code, etc. The campaign entry may also include the participant's identification information such as the participants name, email address, phone number, location, etc. In this way, an audience participant may join a promotional campaign.

Next at 308, the method includes receiving the electronic campaign entry via text message or other suitable communication method at the promotional campaign engine. If the alpha-numeric code included in the text message entry is valid the promotional campaign engine may store the participant's identification information in a participant database.

At 310, the method includes determining the outcome of the promotional campaign. In other words, it is determined if the audience participant is a "winner" (e.g., selected to receive a virtual value item via their mobile computing device) or if the audience participant is a "loser" (e.g., not selected to receive a virtual value item via their mobile computing device). The outcome may be determined based on a rule set established by a merchant. The outcome of the event may be stored in the participant database as campaign data for subsequent review.

If it is determined that the audience participant is a loser then the method includes at 312 notifying the audience participant that they have not been selected to receive a virtual value item. In this way, a participant may be informed of the outcome of the promotional campaign in real-time. In some examples, the message may include additional information allowing the participant to enter the promotional campaign a second time, enter a separate promotional campaign, or go to a website location, keeping the participant engaged in the promotional campaign.

However, if it is determined that the audience participant is a winner, the method includes, at 314, sending a virtual value item request to a virtual value item manager. The virtual value item request may include a request for generation of a virtual value item, a manager-side associative virtual value item profile, as well as a provider-side associative virtual value item profile in a virtual value system. In this way, a virtual value item may be generated in an established virtual value system, allowing a recipient of the virtual value item to implement a transaction with the virtual value item upon receipt of the virtual value item. However, in other embodiments, the virtual value item request may include alternate instructions. Further in some examples the audience participant may be notified that they have been selected to receive a virtual value item. However in other examples, the audience participant may not be notified that they have been selected to receive a virtual value item.

At 316, the method includes sending a virtual value item to the participant's mobile computing device from the virtual value item manager per the campaign rule set. In some examples, the virtual value item may be sent through the promotional campaign engine and then to the audience participant's mobile computing device. However, in other examples, the virtual value item may be sent directly to the audience participant's mobile computing device. The virtual value item may be sent programmatically such that it is sent automatically based on the rule set without additional intervention from external sources. For example, if the participant's campaign entry is selected, the virtual value item may be displayed or otherwise provide notification to a participant on the participant's mobile computing device via a programmatic element (e.g., programmatic instructions). In other words, external interaction via the merchant may not be needed. However in other examples, a person associated with the promotional campaign may verify the winning participants before the virtual value items are sent, to decrease the likelihood of a system error (e.g., sending the wrong number of virtual value items to selected participants).

The audience participant may receive the virtual value item in real-time subsequent to generation of the virtual value item, thereby increasing the efficiency of the promotional campaign when compared to other promotional campaign methods that physically distribute virtual value items. It will be appreciated that the communication platform used to send the virtual value item to the audience participant's mobile computing device may be the same communication platform used by the audience participant to request entry in the promotional campaign. However in other examples an alternate communication platform may be used to send the virtual value item.

Depending on the rule set, an audience participant may be immediately notified and rewarded for participating in certain promotional campaigns. As an example embodiment, winners may receive gift cards immediately on their mobile computing device and may be able to redeem the gift card at participating locations immediately, right from their mobile computing device. The immediate real-time reward allows for campaign organizers to retrieve valuable participant information (such as mobile computing device numbers and participant contact data) relative to the crowd participants, as well as reward the participants and provide immediate gratification for participation in the promotional campaign.

At 318, the method includes redeeming the virtual value item through a goods and services system. It will be appreciated that redemption of the virtual value includes implementation of a virtual value transaction. In some examples implementing a virtual value transaction may include displaying a unique barcode corresponding to a virtual value item on the mobile computing device and scanning the barcode via a barcode reader included in a goods and services system. However in other examples near field communication (NFC) may be used to implement a virtual value transaction. For example, an infrared port may be used to transmit virtual value item data to a goods and services system to implement a virtual value transaction.

At 320 the method includes packaging campaign data for review via the promotional campaign engine. Campaign data may include participant information, including participant information which was submitted with a campaign entry, including, but not limited to, participant contact information, participant survey information, including age, gender, survey preferences, etc. Packaging the campaign data may include requesting data from the participant database, determining the success of participants, determining the virtual value items granted, determining if the virtual value items were claimed, etc. Further in some examples, the packaged campaign data may be sent to the virtual value system (e.g., the virtual value manager, the goods and services system) from the promotional campaign engine. In this way, information from the promotional campaign may be pulled together for review, allowing an individual in a promotional system such as a person in the virtual value system to evaluate and find ways to enhance the promotional campaign.

FIG. 4 shows an exemplary use case 400 for managing a promotional campaign. At 402 the example use case includes establishing campaign constraints prior to an event date. It will be appreciated that the campaign constraints may be included in a campaign rule set.

At 404, the example use case includes delivering a message to the audience that texting XXXX on a mobile computing device may result in a virtual gift card reward. However it will be appreciated that in other embodiments, alternate virtual value items may be provided in the promotional campaign.

At 406, the example use case includes processing the promotional campaign requests. Processing the promotional campaign requests may include at 408 comparing incoming messages to campaign constraints and selectively instructing the virtual value item manager to issue virtual value items to the winning participants.

At 410, the example use case includes sending the virtual value items to the mobile computing devices of the winning participants and notifying the other participants that they were not selected to receive a virtual value item. At 412, the example use case includes redeeming the virtual value item at an appropriate merchant outlet.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein.

Inventions embodied in various combinations and subcombinations of features, functions, elements, and/or properties may be claimed in a related application. Such claims, whether they are directed to a different invention or directed to the same invention, whether different, broader, narrower or equal in scope to any original claims, are also regarded as included within the subject matter of the inventions of the present disclosure.

The invention claimed is:

1. A promotional system for generating a virtual value item for a promotional campaign to be sent to a mobile computing device of a participant, the promotional system comprising:
   a virtual value system comprising:
      an interface with a provider of goods or services; and
      a virtual value item manager configured to:
         generate at least one virtual value item associated with goods or services; and
         communicate with a processor of the provider of goods or services to transact redemption of the at least one virtual value item for an associated good or service;
   a promotional campaign engine comprising a server with a memory executable by a processor communicatively linked to the virtual value system, the promotional campaign engine including:
      a campaign set-up module in the memory, executed by the processor and configured to generate a campaign rule set defining one or more parameters of the promotional campaign and
      a requesting module in the memory, executed by the processor and in selective communication with the campaign set-up module, the requesting module configured to:
         generate and send at least one virtual value item request to the virtual value system, each virtual value item request including code executable to request generation of a virtual value item,
         request generation of at least one associative virtual value item profile identifying the specific virtual value item in the virtual value system,
         using the code executable in the virtual value item request, generating the at least one virtual value item, and
         initiate sending the virtual value item to the mobile computing device of a participant;
   wherein the mobile computing device is selected from a plurality of mobile computing devices based on the campaign rule set.

2. The promotional system of claim 1, wherein the promotional campaign engine is configured to receive a plurality of campaign entries for the promotional campaign from the plurality of mobile computing devices and wherein the promotional campaign engine further includes a selection module configured to select a set of mobile computing devices to which virtual value items are sent, wherein each mobile computing device included in the set of mobile computing devices is associated with a virtual value item request sent to the virtual value system.

3. The promotional system of claim 1, wherein the virtual value system further includes a goods and services system configured to manage virtual value transactions and a virtual value item manager communicatively linked to the goods and services system and configured to generate at least one associative virtual value item profile and the virtual value item and send the virtual value item to the mobile computing device.

4. The promotional system of claim 3, wherein the virtual value item retains stored value and is configured to be utilized in a virtual value transaction through a goods and services system.

5. The promotional system of claim 3, wherein the goods and services system is configured to implement a virtual value transaction, the virtual value transaction including an electronic transaction in which stored value is reduced from the virtual value item in exchange for at least one of a good and a service.

6. The promotional system of claim 1, wherein the campaign rule set includes one or more of the following parameters: a quantity of selected virtual value item recipients, a number of entries per participant, a quantity of virtual value items distributed, a type of virtual value items distributed, a total stored value of the virtual value item, a location for redemption of the virtual value item, a time for redemption of the virtual value item, and a length of the promotional campaign.

7. The promotional system of claim 1, where the virtual value item is sent to the mobile computing device programmatically in response to receipt of an entry from the mobile computing device based on the campaign rule set.

8. The promotional system of claim 1, where the promotional campaign engine further comprises a tracking module configured to track programmatic actions performed by the promotional campaign engine.

9. The promotional system of claim 1, wherein the parameters are configured to be dynamically adjusted during implementation of the promotional campaign.

* * * * *